US007899323B2

(12) United States Patent
Underwood et al.

(10) Patent No.: US 7,899,323 B2
(45) Date of Patent: Mar. 1, 2011

(54) MULTI-INTERFACE PROTOCOL ANALYSIS SYSTEM

(75) Inventors: Rosa M. Underwood, Washington, DC (US); Henry A. McKelvey, Capitol Heights, MD (US); Umang A. Patel, Bellerose, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 728 days.

(21) Appl. No.: 11/863,854

(22) Filed: Sep. 28, 2007

(65) Prior Publication Data

US 2009/0087179 A1 Apr. 2, 2009

(51) Int. Cl.
*H04B 10/08* (2006.01)
*H04B 17/00* (2006.01)

(52) U.S. Cl. .............................. 398/25; 398/9; 398/10; 398/16; 398/17; 398/36; 398/58; 398/66; 398/154; 398/164; 398/168; 370/241; 370/431; 370/464

(58) Field of Classification Search .................... 398/9, 398/17, 25, 36, 57–73, 154, 164, 168; 370/353–498
See application file for complete search history.

(56) References Cited

U.S. PATENT DOCUMENTS

| | | | | |
|---|---|---|---|---|
| 6,362,908 | B1 * | 3/2002 | Kimbrough et al. | 398/164 |
| 7,002,995 | B2 * | 2/2006 | Chow et al. | 370/485 |
| 7,039,041 | B2 * | 5/2006 | Robohm et al. | 370/352 |
| 2003/0137975 | A1 * | 7/2003 | Song et al. | 370/353 |
| 2006/0013247 | A1 * | 1/2006 | Koch et al. | 370/437 |
| 2006/0013260 | A1 * | 1/2006 | Oron | 370/498 |
| 2006/0256811 | A1 * | 11/2006 | Saito et al. | 370/465 |
| 2006/0256813 | A1 * | 11/2006 | Brusca et al. | 370/466 |
| 2007/0133576 | A1 * | 6/2007 | Tsuge et al. | 370/401 |
| 2008/0037579 | A1 * | 2/2008 | Lee et al. | 370/463 |
| 2008/0279554 | A1 * | 11/2008 | Kazawa et al. | 398/69 |

* cited by examiner

*Primary Examiner*—Li Liu

(57) ABSTRACT

A device may include a first network module to capture network data at a first location in a network and a second network module to capture network data at a second location in the network different from the first location in the network. The device may include a control module to receive control commands relating to the first network module and the second network module. The control module may forwarded the control commands to the first network module and the second network module. The control module may receive the captured network data from the first network module and the second network module.

17 Claims, 5 Drawing Sheets

BUS
310
ROM
340
MAIN
MEMORY
330
PROCESSOR
320
COMMUNICATION
INTERFACE
360
STORAGE
DEVICE
350
130

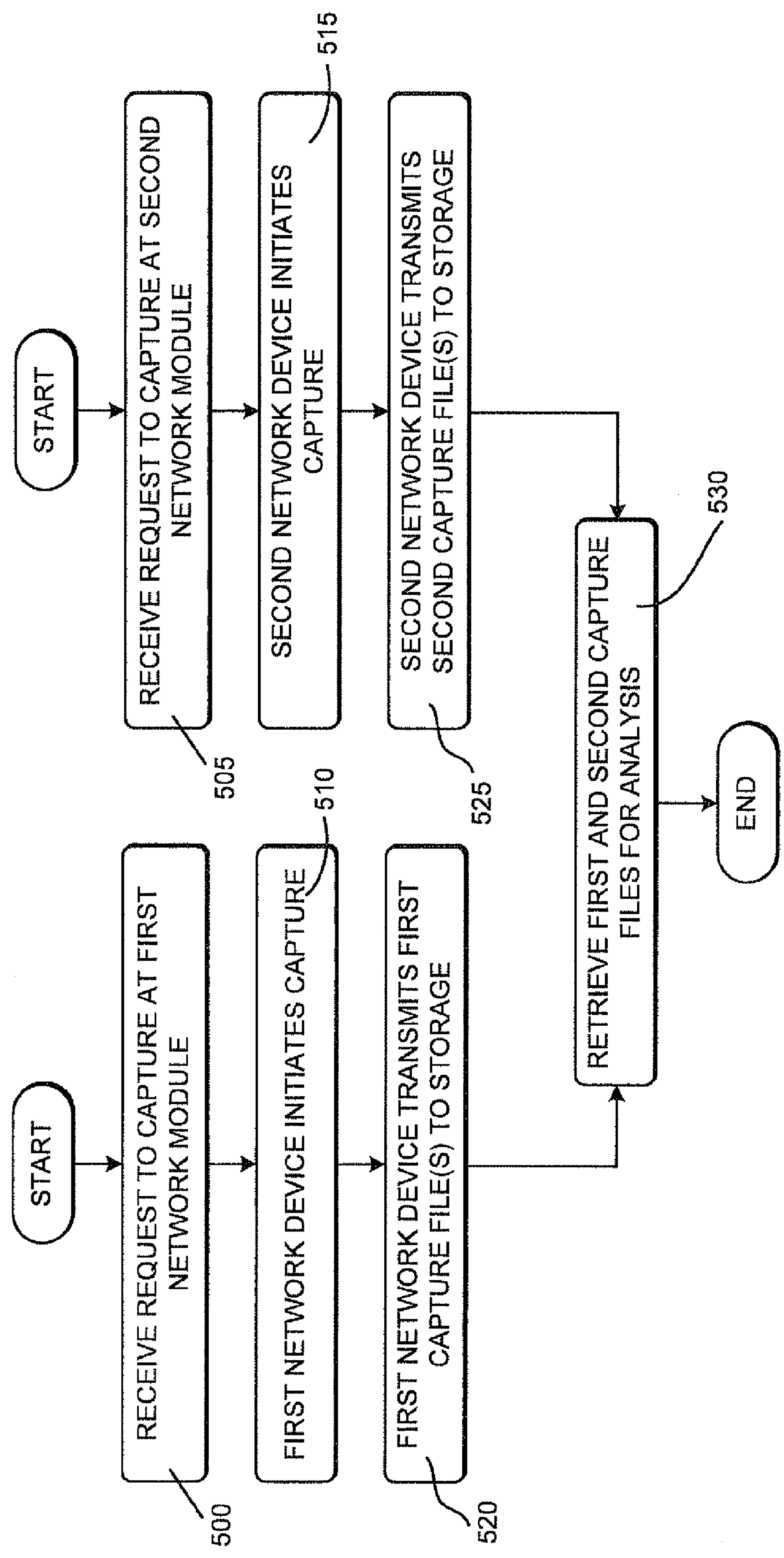
FIG. 5
START
RECEIVE REQUEST TO CAPTURE AT FIRST NETWORK MODULE
500
FIRST NETWORK DEVICE INITIATES CAPTURE
510
FIRST NETWORK DEVICE TRANSMITS FIRST CAPTURE FILE(S) TO STORAGE
520
START
RECEIVE REQUEST TO CAPTURE AT SECOND NETWORK MODULE
505
SECOND NETWORK DEVICE INITIATES CAPTURE
515
SECOND NETWORK DEVICE TRANSMITS SECOND CAPTURE FILE(S) TO STORAGE
525
RETRIEVE FIRST AND SECOND CAPTURE FILES FOR ANALYSIS
530
END

MULTI-INTERFACE PROTOCOL ANALYSIS SYSTEM

BACKGROUND INFORMATION

Assuring high performance in today's data networks is of utmost importance. Accordingly, modern networks may be subjected to a variety of testing scenarios to both identify problems and maximize network potential. In testing for network functionality, conventional testing may include placement of single circuit protocol analyzers within the network to provide data relating to traffic passing through the analyzer. Unfortunately, known protocol analyzers must be set up individually and can only analyze one circuit at a time, thereby complicating testing due to the ambiguity of where to place the units and what data would need to be captured and when the data would need to be captured.

BRIEF DESCRIPTION OF THE DRAWINGS

FIG. 5 is a flow chart of an exemplary process of enabling data analysis at multiple interfaces, consistent with exemplary embodiments.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein provide for enhanced network testing by facilitating the monitoring and correlation of network information from a number of interface points. In one embodiment, interface modules associated with an optical line termination (OLT) unit may capture network information as it passes through each module. The network information may be collected and forwarded to a protocol analyzer for correlation and subsequent analysis.

Figure 1:
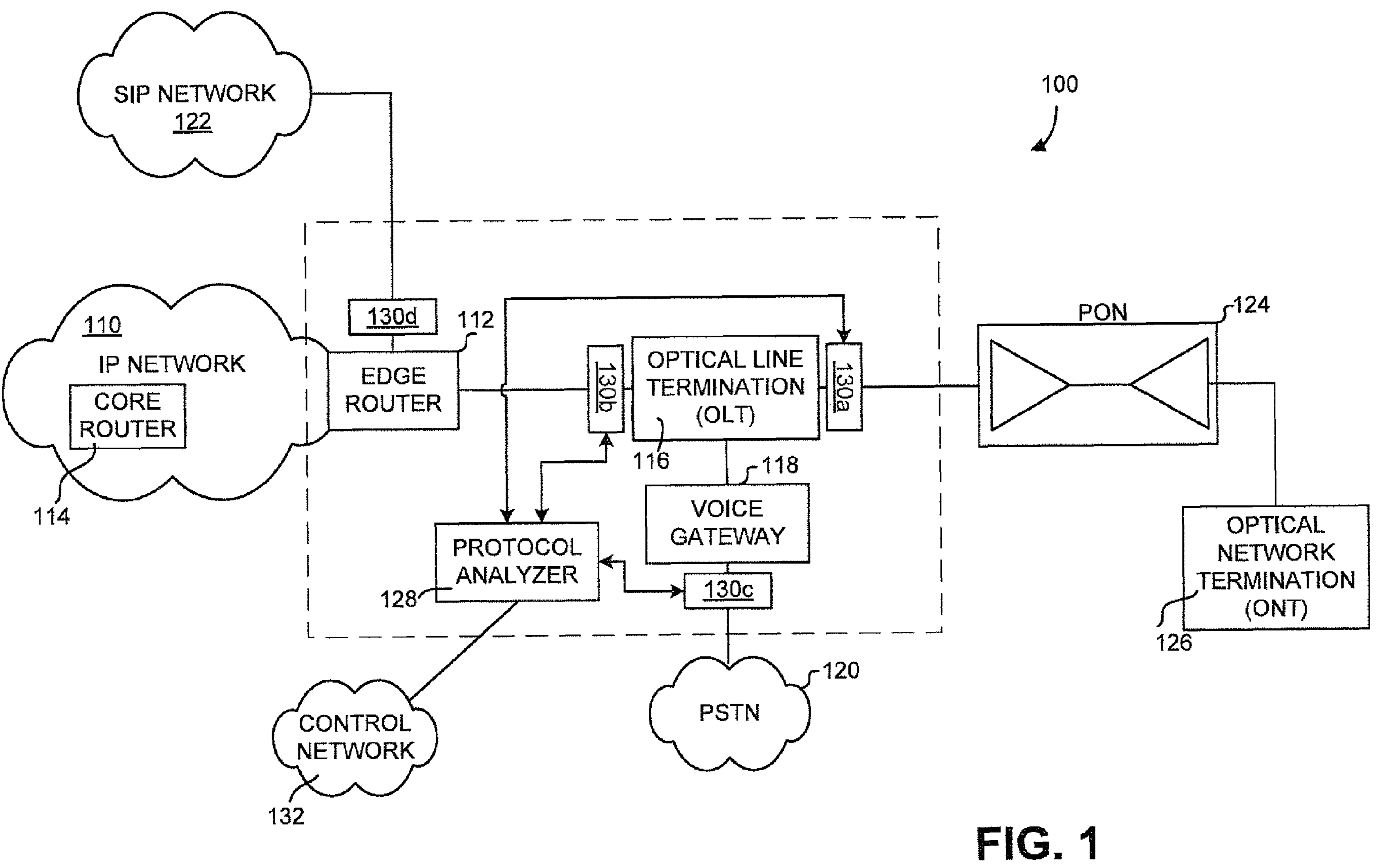
FIG. 1 is a diagram of an exemplary system in which embodiments described herein may be implemented.

FIG. 1 is a diagram of an exemplary system in which embodiments described herein may be implemented. As illustrated, system 100 may include a first network 110, edge router 112, core router 114, OLT unit 116, voice gateway 118, public switched telephone network (PSTN) 120, session initiation protocol (SIP) network 122, passive optical network (PON) 124, optical network termination (ONT) unit 126, protocol analyzer 128, network modules 130*a*, 130*b*, 130*c*, and 130*d*, and control network 132.

First network 110 may include a Local Area Network (LAN), a wide area network (WAN), such as a cellular network, a satellite network, or the Internet, a private WAN, or a combination of the Internet and a private WAN, that is used to transport data. First network 110 may include a number of network devices. As is particularly shown in FIG. 1, first network 110 may include a number of routers or other switching devices that transmit electrical data units, such as data packets, through first network 110. For example, first network 110 may include edge router 112 and core router 114.

Edge router 112 may generally function to connect devices, such as OLT unit 116, voice gateway 118, and ONT unit 126, to first network 110. Core router 114 may generally function to transmit data between other routers within first network 110. In addition to simply routing data, edge router 112 and core router 114 may support other "value added" functions, such as quality of service (QoS) features, specialized security functions, such as IPsec (IP security) encryption, access control, statistics relating to multicast transmissions, or accounting features.

Voice gateway 118 may include any device capable of connecting first network 110 or OLT unit 116 to PSTN 120. Additionally, voice gateway 118 may include hardware and/or software for converting data from a PSTN format to a format compatible with first network 110 (e.g., Ethernet, Gigabit Ethernet, 10 Gigabit Ethernet, ATM (asynchronous transfer mode), MPLS (multi-protocol label switching), etc.) or OLT unit 116 (e.g., SONET (synchronous optical network)). Similarly, voice gateway 118 may include hardware and/or software for converting data from a format compatible with first network 110 or OLT unit 116 to a format useable by PSTN 120. For example, voice gateway 118 may convert voice calls between a packet data format compatible with first network 110 and a circuit-switched format compatible with PSTN 120.

PSTN 120 may include any network capable of carrying plain old telephone system (POTS) compatible data. For example, PSTN 120 may include a circuit-switched network that may be implemented via fixed-line analog connections or digital connections. PSTN 120 may include central offices and/or switches for carrying data over twisted pair copper conductors and/or optical fibers.

SIP network 122 may include any network capable of carrying or facilitating session initiation protocol communications. For example, SIP network 122 may include SIP devices and proxy servers for supporting SIP communications.

A network service provider, such as for example, a telecommunications company providing network connectivity to a subscriber at ONT unit 126, may provide connectivity between first network 110, PSTN 120, and SIP network 122 through optical connections. As shown in FIG. 1, for example, the optical connections may be provided by OLT unit 116 and PON 124. OLT unit 116 may include hardware and/or software for providing an interface between PON 124 and the backbone network (e.g., first network 110, voice gateway 118, PSTN 120, and SIP network 122). OLT unit 116 may, for instance, be responsible for allocating bandwidth to subscribers and may provide time division multiplexed (TDM) interfaces such as SONET/SDH or PDH with PON 124. In general, OLT unit 116 may receive data from edge router 112 or voice gateway 118 and may provide the data to a subscriber of PON 124 at ONT unit 126 via TDM techniques.

PON 124 may include one or more strands of optical fiber and splitters for the optical fiber. The optical fibers that make up PON 124 may be physically distributed to a number of subscribers. For example, PON 124 may implement a fiber to the premises (FTTP) network in which a number of subscribers are provided with network connectivity by a length of optical fiber that runs from OLT unit 116 to the premises of the subscribers. The FTTP network may be used to provide, for example, one or both of telephone and broadband services (i.e., Internet connection, television, etc.) to the subscribers. PON 124 may include a high-speed fiber optic network, such as Verizon's FiOS™ network. It should be understood that the general term PON may be interpreted to include multiple variations including Broadband PON (BPON), Gigabit PON (GPON), 10 Gigabit Ethernet PON (10 GE-PON), etc.

ONT 126 may provide the termination points for a fiber line that terminates at the premise of a subscriber. ONT 126 may provide an interface between the fiber optic line and one or more wired or wireless networks within the subscriber's premises. ONT 126 may thus operate to terminate PON 124 and present native service interfaces to the subscribers. These services can include voice (e.g., plain old telephone service (POTS), voice over IP (VoIP) (e.g., session initiation protocol or H.248), etc.), data (e.g., Ethernet, V.35, etc.), video, and/or telemetry.

Consistent with aspects described herein, network modules 130*a*, 130*b*, 130*c*, and 130*d* (collectively, "network modules 130") may be configured to capture network data at a number of locations or interfaces within system 100 and relay or transmit the data to protocol analyzer 128. As will be discussed in detail below, each network module 130 may be configured to convert an optical data stream presented at its interface to a corresponding electrical signal. The data included in the electrical signal may be captured and forwarded to protocol analyzer 128. The captured data may be time-stamped, tagged, and stored in a database or other memory structure (not shown) for subsequent review and analysis. In one implementation, network modules 130 may be provided as cards in a multicard chassis, such that each module is commonly located, configured, and controlled.

Each network module 130 may be configured according to the interface with which it is associated. For example, network module 130*a* may be located at the interface between PON 124 and OLT 116 and may be configured to process data presented at this interface. Network module 130*b* may be located at the interface between OLT 116 and edge router 112 and may be configured to convert the optical stream at that interface to ATM cells. Network modules 130*c* and 130*d* may be located at the interface between PSTN 120 and voice gateway 118 and the interface between edge router 112 and SIP network 122, respectively. Network modules 130*c* and 130*d* may be configured to convert the optical stream at these interfaces to Ethernet frames prior to data capture. It should be noted that, for each interface, network modules 130 may be configured to extract electric signals and/or data units corresponding to the interface. Additionally, higher level processing may be performed to convert the extracted data into other formats prior to capture. For example, a network module located at an ATM interface, such as the interface between OLT 116 and edge router 112, may be configured to extract ATM cells from an optical signal and convert the ATM cells into Ethernet frames.

Control network 132 may include any network capable of carrying or facilitating transmission of control information to network modules 130*a*-130*d*. For example, control network 132 may be an out-band network using a secure and dedicated network. Additionally, control network 132 may be configured to carry certain types of data, such as SNMP (simple network management protocol) messages, that support network control or management operations.

The exemplary configuration illustrated in FIG. 1 is provided for simplicity. It should be understood that a typical system may include more or fewer devices than illustrated in FIG. 1.

Figure 2:
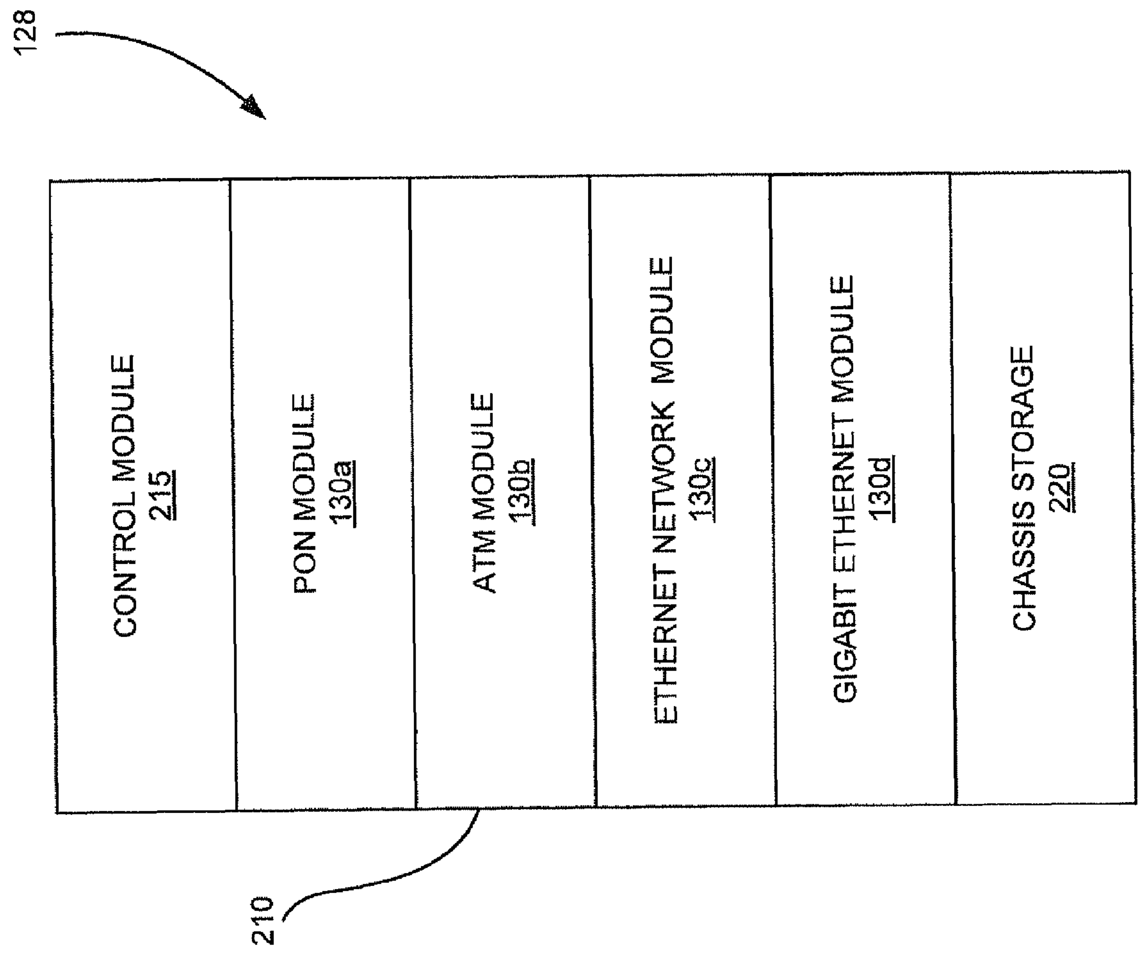
FIG. 2 is a diagram illustrating an exemplary implementation of a multi-module protocol analyzer configured to include the network modules of FIG. 1.

FIG. 2 is a diagram illustrating an exemplary implementation of a multi-module protocol analyzer 128 configured to include network modules 130*a*-130*d*, control module 215, and chassis storage 220. As illustrated, multi-module protocol analyzer 128 may include a chassis 210 configured to receive network modules 130*a*-130*d* having card or blade-type form factors.

Control module 215 may be configured to provide control access to each of modules 130*a*-130*d* using a common interface to control network 132. Additionally, control module 215 may be configured to provide protocol analysis functionality relating to each network module 130. For example, control module 215 may include software or hardware capable to receive and/or retrieve data captured at network modules 130 and provide analysis functionality relating to the data. In one exemplary implementation, control module 215 may include an operating system, such as a Linux operating system, executing software such as Pshark, Wireshark, Ethereal, Etherape, etc., for enabling viewing of data captured at various ones of network modules 130.

Chassis storage 220 may include a solid state (e.g., flash), magnetic, and/or optical recording medium and its corresponding drive for receiving and store capture data and/or analysis information from modules 130*a*-130*d*. Chassis storage 220 may be further configured to receive and store module configuration information from control module 215.

Because network data may be captured at a variety of locations in system 100, the data may be subsequently accurately correlated to identify problems in system 100 as they occur. For example, a user could easily retrieve data captured at both the OLT-PON interface (via network module 130*a*) and the OLT-Network 110 interface (via network module 130*b*). The user may then identify corresponding traffic based on matching sequence numbers associated with the data.

Figure 3:
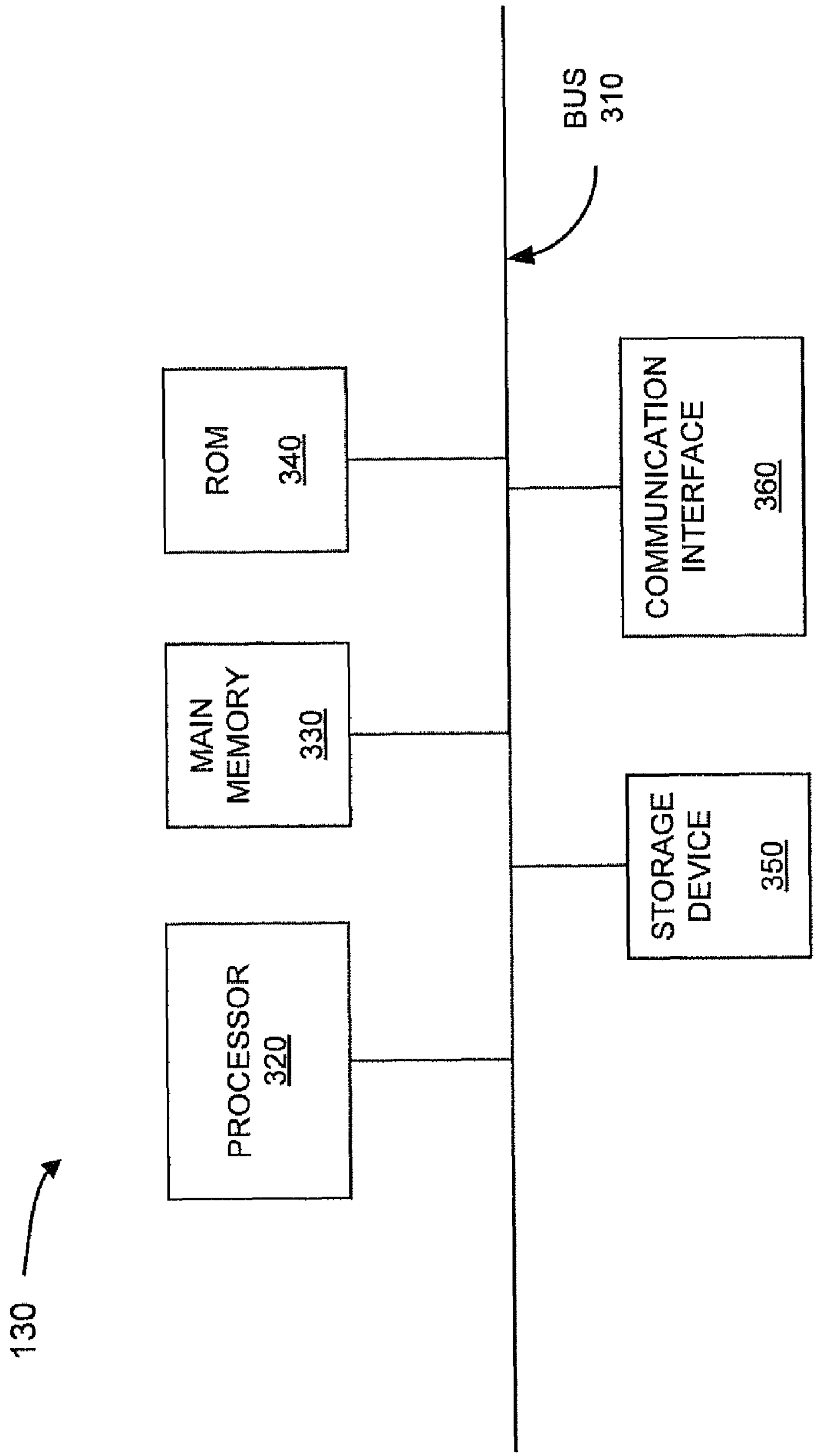
FIG. 3 is an exemplary diagram of one of the network module of FIG. 1.

FIG. 3 is an exemplary diagram of a network module 130, which may correspond to one or more of network modules 130*a*-130*d* discussed above in relation to FIG. 1. Network module 130 may include a bus 310, processor 320, main memory 330, read only memory (ROM) 340, storage device 350, and communication interface 360. Bus 310 may include a path that permits communication among the elements of network module 130.

Processor 320 may include a processor, microprocessor, or processing logic (e.g., an application-specific integrated circuit (ASIC), a field programmable gate array (FPGA), etc.) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a solid state (e.g., flash), magnetic, and/or optical recording medium and its corresponding drive.

Communication interface 360 may include one or more transceiver-like mechanisms that enable the network module 130 to communicate with other devices and/or systems. For example, communication interface 360 may include mechanisms for communicating with another device, such as OLT 116, edge router 112, voice gateway 118, SIP network 122, or control network 132. Additionally, communication interface 360 may include one or more sockets for facilitating connection with chassis 210 of multi-module protocol analyzer 128. Such sockets may facilitate powering of network module 130 using a power supply or communication interface(s) common to multi-module protocol analyzer 128.

As described briefly above, network modules 130 may perform certain network analysis-related operations. The network modules entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as storage device 350, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
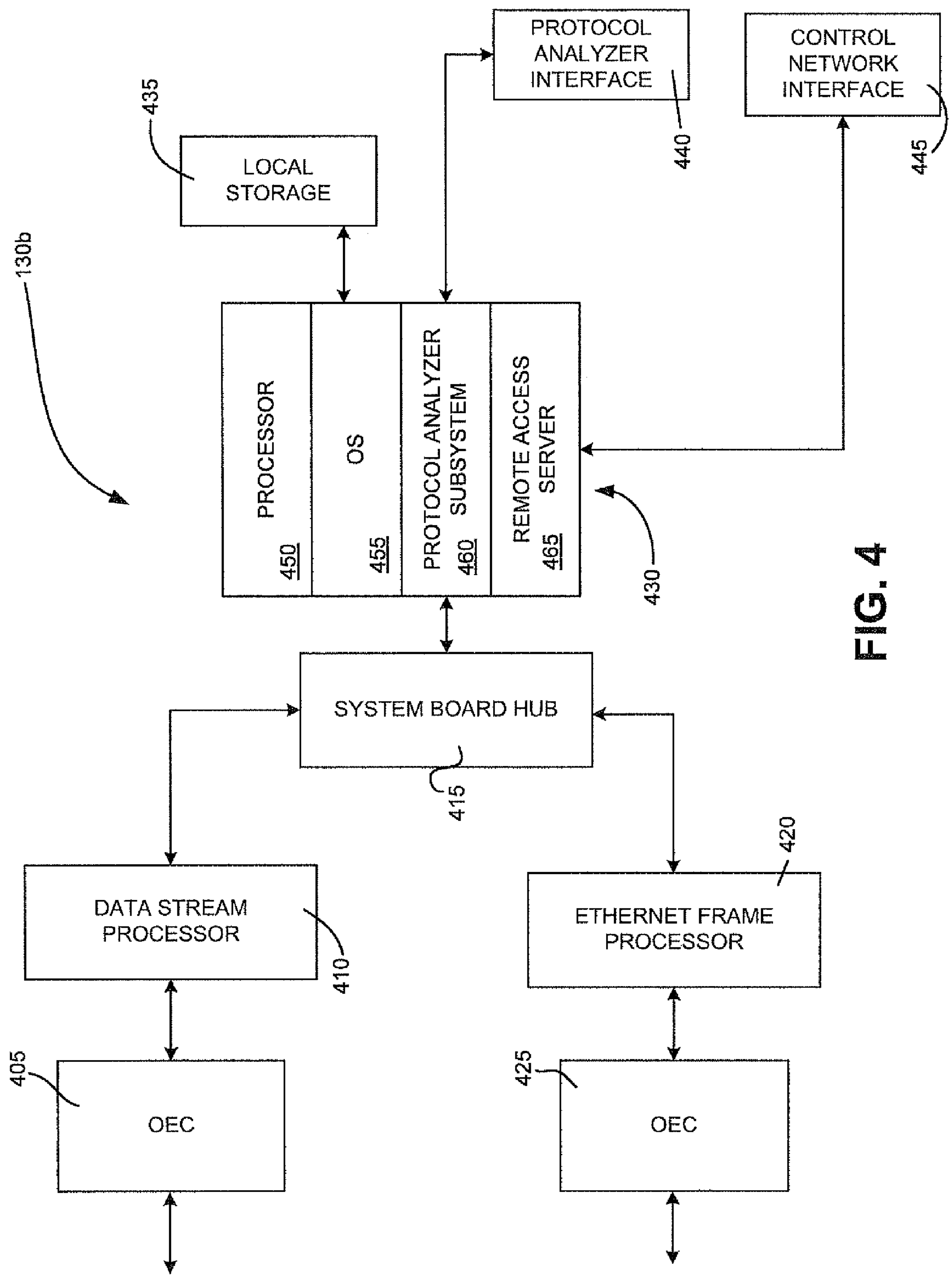
FIG. 4 is a functional block diagram of a network module of FIG. 1.

FIG. 4 is a functional block diagram of network module 130*b* illustrating one exemplary implementation. As illustrated, network module 130*b* may include network-side optical to electrical converter (OEC) 405, network-side data stream processor 410, system board hub 415, OLT-side data stream processor 420, OLT-side OEC 425, system board 430, local storage 435, protocol analyzer interface 440, and control network interface 445.

For purposes of brevity, the following description will be made assuming that data to be captured is traveling from network 110 to OLT 116. It should be understood that similar functionality may be provided for data traveling in a reverse path from OLT 116 toward network 110. Further, although the above-description relates to network module 130*b*, similar functionality may be found in modules 130*a*, 130*c*, and 130*d*.

Network-side OEC 405 may include a device capable of receiving an optical data stream from edge router 112 and converting the optical data stream into an electrical signal. Network-side data stream processor 410 may receive the electric signal from network-side OEC 405 and may convert the received electrical signal into a series of Ethernet frames or other suitable electrical data units. As discussed above, processor 410 may perform additional conversion operations resulting in other or additional data formats. Network-side data stream processor 410 may include any suitable processor, microprocessor, or processing logic (e.g., ASIC, FPGA, etc.) that may interpret and execute instructions. Although Ethernet frames are discussed above as the output of network-side data stream processor 410, it should be noted that any suitable data type or unit may be supported, such as ATM cells, ATM encapsulated Ethernet Frames, etc.

System board hub 415 may receive the converted Ethernet frames from network-side data stream processor 410 and deliver the frames out on two output interfaces, a first toward OLT-side data stream processor 420 and a second toward system board 430. In this manner, the Ethernet frames received from network-side data stream processor 410 are essentially duplicated and passed to each of OLT-side data stream processor 420 and system board 430.

OLT-side data stream processor 420 converts received Ethernet frames into electrical signals and forwards the signals to OLT-side OEC 425 for transmission to OLT 116. By providing system board hub 415, capture and analysis on traffic passing between edge router 112 and OLT 116 is performed with minimal impact on traffic speeds and latency.

Returning to system board 430, upon receipt of an Ethernet frame signal from system board hub 415, system board 430 operates to capture the received frames or packets. In one implementation, system board 430 includes system processor 450 executing operating system 455, protocol analyzer subsystem 460, and remote access server 465. System processor 450 may include any suitable processor, microprocessor, or processing logic (e.g., ASIC, FPGA, etc.) that may interpret and execute instructions. Operating system 455 may include any suitable operating system for supporting the execution of suitable data capturing and forwarding applications. In one implementation, operating system 455 may include a Linux operating system, such as the Busy-Box OS.

Protocol analyzer subsystem 460 may include software or hardware capable of capturing, analyzing, and transmitting data received by system board 430. In one implementation, protocol analyzer subsystem 460 may include software tools such as TCPDump, or TCP-CAP to capture received Ethernet frames and output the captured data in a time-stamped, text file format. In one implementation, the output files may include information captured in the headers or payload of each frame or packet received. This information may include protocol information, source and destination address information, source and destination port information, and sequence number information. The sequence number information relates to a unique value between sets of source and destination addresses that indicate a packet's position in a given flow session. This sequence number information enables a user/device to more completely synchronize and analyze the data at a later time. The output files may then be forwarded to local storage 435 or protocol analyzer interface 440 for subsequent review and analysis. In one implementation, local storage 435 may include locally maintained memory device for receiving and storing subsets of globally captured data and/or for providing redundant backup for cases of data loss.

In one implementation, protocol analyzer interface 440 may provide a connection between network module 130*b* and control module 215. In other implementations, protocol analyzer interface 440 may provide a connection between network module 130*b* and a remote analysis device (not shown) for storage and analysis. In these implementations, users of the remote analysis device may retrieve and analyze network data from a variety of distributed network modules. Exemplary users may include field technicians, operations personnel, lab technicians needing to make checks on data streams, and testers who have to use protocol analysis data.

Remote access server 465 may include software or hardware capable of receiving control commands from control network interface 445. In one implementation, control network interface 445 may be configured to connect network module 130*b* with control network 132 via control network access module 215. For example, remote access server 465 may include an SSH (secure shell) server configured to enable users to log into network module 130*b* from control network 132 and modify settings, etc. for network module 130*b*. In one implementation, such settings may include commands to initiate data capture, perform a local storage of a potion of the capture data, configuration settings for network-side and OLT-side data stream processors 415 and 420, etc. Exemplary configuration settings for network-side and OLT-side data stream processors 415 ad 420 may include collection and transmission of processor and performance monitoring statistics, alarm settings relating to processors 415 and 420, etc. The alarm settings may instruct processors 415 and 420 to generate alarms and/or notifications via remote access server 465 in the event that either processor 415 or 420 fails to receive data expected streams from OECs 410 and 430.

In one implementation, network data captured by network modules 130 may be maintained in a database, such as a SQL or MySQL database. In such an implementation, captured data may be subsequently made available to a web server for efficient review.

It should be noted that any type of data may be captured and analyzed. For example, real time protocol (RTP) data may be captured and reviewed at various locations associated with a service provided. Using a number of network modules 130, the RTP data for a specific session (e.g., a voice over IP call), the quality of the session may be dynamically monitored. Such a multi-location analysis may provide for real time adjustments to the session that dynamically improve a caller's experience.

FIG. 5 is a flow chart of an exemplary process of enabling data analysis at multiple interfaces, consistent with exemplary embodiments. In one embodiment, the processing of FIG. 5 may be performed by one or more components within multi-module protocol analyzer 128. In another embodiment, some or all of the processing described below may be performed by another component or group of components including or excluding components within system 100.

Processing may begin with network modules 130*a* receiving a user command to begin data capture (block 500). Similarly, network module 130*c* may also receive a command to begin data capture (block 505). In one implementation, the commands to begin data capture may be received directly from a user or users via control network 132 and remote access servers 465 on modules 130*a* and 130*c*. In another implementation, the data capture commands may be received via control module 215 on multi-module protocol analyzer 128. It should be understood that a suitable data capture command may be received either directly or indirectly and may result from additional commands directed toward control module 215 or another network management or testing device (not shown). Further, it should be noted that the commands to initiate data capture may further designate a type of data or traffic to be captured. In one exemplary implementation, such designations may be made using command flags or options, or using filters or Boolean expressions.

Upon receipt of the data capture commands, network modules 130*a* and 130*c* each initiate capture of data at their respective protocol analyzer subsystems 460 (blocks 510 and 515, respectively). As described above, in one exemplary implementation, this process may include execution of a packet capturing application by packet analyzer subsystems 460. Network module 130*a* may transmit one or more data capture files to a storage device (block 520). Similarly, network module 130*c* may transmit one or more data capture files to the storage device (block 525). As described above, captured data may be forwarded to various locations for subsequent analysis or review. In one implementation, the captured data files may be forwarded to chassis storage 220. Alternatively, the captured data files may be forwarded to a storage location remote from multi-module protocol analyzer 128. In yet another implementation, the captured data files may be forwarded to local storage 435 associated with the respective network module 130.

Regardless of where the captured data files are stored, each element of data (e.g., each packet) referenced in each data file may be associated with the network module or interface from which it was received and a timestamp indicating the time in which it was captured. Moreover, as described above, each data file may include information included within the header and/or payload of the captured packet.

Once forwarded and stored, the data captured from each of network modules 103*a* and 103*c* may be retrieved for analysis (block 530). In one implementation, such retrieval may be performed by a protocol analysis application executing on control module 215. Alternatively, the retrieval may be performed by a remote device or application having access to the stored data. Because each data file includes information designating the flow and sequence information for each captured data unit (e.g., each frame or packet), data obtained at multiple points within system 100 may be easily and accurately synchronized and correlated to provide for enhanced analysis. For example, sequence numbers relating to data captured at multiple points within system 100 may be used to synchronize the data captures in real-time or later, thereby providing a system-wide view of data as it travels through system 100.

CONCLUSION

Implementations described herein enable efficient and coordinated analysis of a data network at multiple interfaces. More specifically, a multi-module protocol analyzer may be configured to include network modules corresponding to various locations in a network. Each network module may be configured to capture network data and forward the network data for subsequent analysis in either real-time or at a later time. The data captured at multiple locations may then be synchronized or correlated to facilitate problem identification and analysis.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of acts has been described above with respect to FIG. 5, the order of the acts may differ in other implementations. Moreover, non-dependent acts may be performed in parallel.

It will be apparent that features of the invention, as described above, may be implemented in many different forms of software, firmware, and hardware in the implementations illustrated in the figures. The actual software code or specialized control hardware used to implement the invention is not limiting of the invention. Thus, the operation and behavior of the aspects of the invention were described without reference to the specific software code—it being understood that one would be able to design software and control hardware to implement the aspects based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:

a first network module to capture network data at a first location in an optical network;

a second network module to capture network data at a second location in the network different from the first location in the network, wherein each of the first and second network modules comprise:

a first optical to electrical converter to convert optical signals received at the first and second locations, respectively, into electrical data units; and a system board to capture the electrical data units from the first optical to electrical converter and transmit the captured electrical data units to a storage location in a text-based file; and a control module to:

receive control commands relating to the first network module and the second network module;

forward the control commands to the first network module and the second network module; and receive the captured network data from the first network module and the second network module.

2. The device of claim 1, where the first location comprises an interface between an optical line termination (OLT) unit and a passive optical network.

3. The device of claim 1, where the first location comprises an interface between an optical line termination (OLT) unit and an edge router.

4. The device of claim 1, where the first location comprises an interface between an optical line termination (OLT) unit and a voice gateway.

5. The device of claim 1, where the first location comprises an interface between an edge router and a session initiation protocol (SIP) network.

6. The device of claim 1, further comprising:

a second optical to electrical converter to convert the electrical data units into an optical signal and output the optical signal to the optical network; and a hub for receiving the electrical data units from the first optical to electrical converter and outputting the electrical data units to each of the system board and a second optical to electrical converter.

7. The device of claim 1, where the system board further comprises a protocol analyzer subsystem to capture the electrical data units from the first optical to electrical converter and record them into the text-based file.

8. The device of claim 7, where the text-based file includes at least header information for each captured electrical data unit.

9. The device of claim 8, where the text-based file further includes a timestamp associated with each captured electrical data unit.

10. The device of claim 1, where the system board further comprises a remote access server to receive the control commands from the control module.

11. The device of claim 1, where the electrical data units comprise one of Ethemet frames, Ethernet packets, or Asynchronous Transfer Mode cells.

12. The device of claim 1, further comprising:

a storage device to store the text-based file for each of the first network module and the second network module.

13. The device of claim 1, further comprising a chassis for containing the first network module, the second network module, and the control module, where the chassis further includes a power supply to provide power to each of the first network module, the second network module, and the control module.

14. A method, comprising:

receiving a first command to capture first network data at a first optical line termination (OLT) unit interface;

capturing the first network data at the first OLT unit interface in response to the first command;

outputting a first data capture file corresponding to the captured first network data;

storing the first data capture file;

receiving a second command to capture second network data at a second OLT unit interface;

capturing the second network data at the second OLT unit interface in response to the second command;

outputting a second data capture file corresponding to the captured second network data;

storing the second data capture file;

receiving a request to analyze the first data capture file and the second data capture file; and outputting the first data capture file and the second data capture file in a correlated manner.

15. The method of claim 14, where the first data capture file and the second data capture file include at least header information corresponding to the captured first network data and the captured second network data, respectively.

16. The method of claim 15, where the where the first data capture file and the second data capture file include sequence number information corresponding to the captured first network data and the captured second network data, respectively.

17. A system, comprising:

logic to receive control commands from a user;

logic to capture first network traffic at a first optical line termination (OLT) unit interface in response to the control commands;

logic to forward the captured first network traffic to a first storage device; logic to capture second network traffic at a second OLT unit interface in response to the control commands;

logic to forward the captured second network traffic to a second storage device;

logic to retrieve the first captured traffic and the second captured traffic from the first and second storage devices;

logic to synchronize the captured first network traffic with the captured second network traffic; and logic to provide the synchronized and captured first network traffic and second network traffic to the user.

* * * * *